Figure 1:
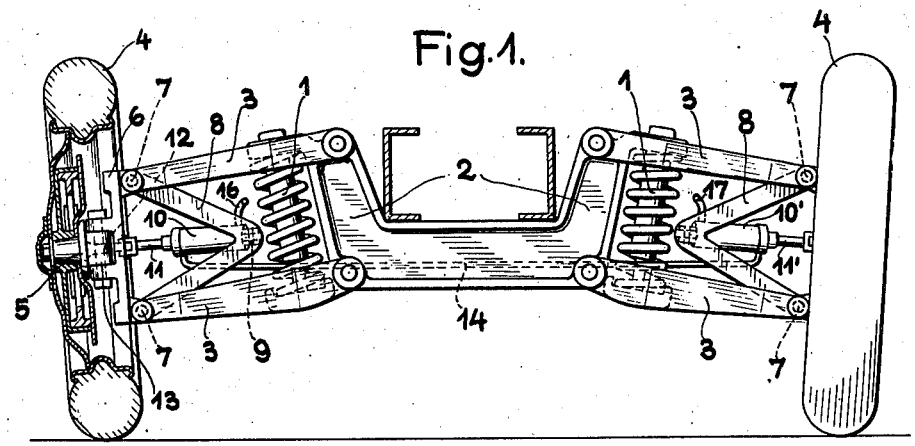

March 22, 1938. J. LATZEN 2,111,668

HYDRAULICALLY CONTROLLED STEERING MECHANISM

Filed Jan. 7, 1937

Inventor,
Josef Latzen,
By Frank S. Ashleman,
attorney.

Patented Mar. 22, 1938

2,111,668

UNITED STATES PATENT OFFICE 2,111,668

HYDRAULICALLY CONTROLLED STEERING MECHANISM

Josef Latzen, Dusseldorf-Oberkassel, Germany

Application January 7, 1937, Serial No. 119,498
In Germany August 4, 1934

3 Claims. (Cl. 280—87)

This invention relates to improvements in or connected with hydraulically controlled steering mechanism for wheels mounted on parallel links and more particularly for the steered wheels as used with power driven vehicles.

It is well known that the oscillation of the revolving wheels and particularly in case of the wheels being mounted on parallel links, cause shimmying and such like disturbances in the steering gear. It has, therefore, been proposed to provide hydraulic steering cylinders rigidly connected with the axle or with the chassis, but by the provision of these hydraulic steering cylinders the desired purpose of eliminating the shimmying in the steering gear, caused by reason of the rigid connection between the piston positively guided in the cylinder, and the freely oscillating running wheel, has not been achieved.

It has further been proposed to provide specially designed parallel links with the view of eliminating the shimmying in the steering gear, but also these parallel links have not warranted exactly determinable paths of motion of the floating steering knuckle of the vehicle wheel on account of the latter simultaneously oscillating in the vertical as well as in the horizontal plane to a considerably variating degree. In consequence thereof it has heretofore been difficult to construct a non-shimmying steering gear between one point of the chassis and the steering knuckle of the steered wheel.

Figure 2:
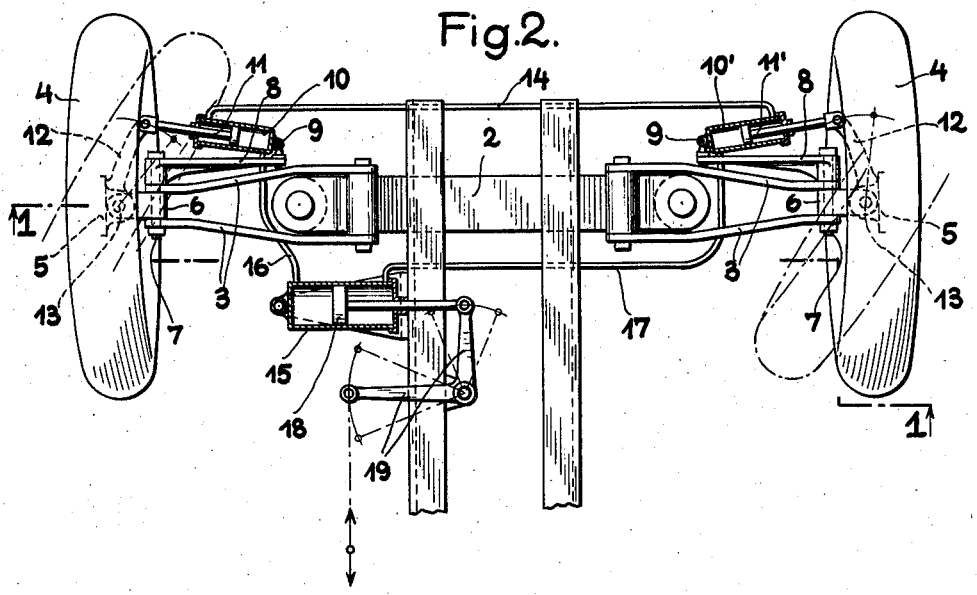

This drawback has been entirely eliminated by the hydraulic steering mechanism designed according to the present invention. To this end one main pressure cylinder and two auxiliary hydraulic steering cylinders are mounted on the chassis, the piston of the main hydraulic cylinder being controlled by the known steering wheel by means of suitable steering gear operated from the driver's seat, whilst one auxiliary steering cylinder is provided for each steered wheel of the vehicle and connected therewith by suitable steering mechanism. Communication between the interior of the said main hydraulic cylinder and the two auxiliary cylinders and between the latter themselves is established by means of flexible pipe conduits in such manner, that the rear end of the main cylinder communicates with the rear end of the one auxiliary cylinder and the head end of the former communicates with the rear end of the other auxiliary cylinder, whilst the head ends of the auxiliary cylinders also communicate between themselves. As above indicated the piston of the main hydraulic cylinder is controlled by the known steering wheel and suitable steering gear, whilst the piston rods of the auxiliary cylinders are adapted to act upon levers extending from the steering knuckle and forming rigid parts thereof. Provision has been made of a suitable steering gear and suspension for the steered wheels and connection between the steered wheels and the parallel links as will be more fully and readily understood from the following description of the hydraulic steering mechanism with reference to the annexed drawing in which a steering mechanism according to the present invention is schematically illustrated by way of example. It represents:

Fig. 1 a section through the front part of a vehicle on line 1—1 of Fig. 2 and

Fig. 2 a plan view of Fig. 1 partly in section.

The hydraulic steering mechanism comprises three main units, viz. a main hydraulic pressure cylinder 15, two auxiliary hydraulic steering cylinders 10, 10' and a convenient steering gear as more particularly referred to hereafter. The main hydraulic pressure cylinder 15 is rigidly connected onto the chassis 2 and the rod of the piston 18 is pivoted onto one shank of a bell crank lever 19, the other shank of which is pivoted onto the known steering gear of the steering wheel. The auxiliary hydraulic steering cylinders 10, 10' for the steered wheels 4 are pivoted at 9 onto angular brackets 8 themselves pivoted with their outer ends onto the outer ends of the parallel links 3 which latter are suitably attached to the chassis 2 in a known manner. Onto the outer ends of the parallel links 3 and between their shanks is also pivoted an intermediate connecting link 6, pivoting of the angular brackets 8 and the intermediate connecting link 6 onto the parallel links 3 being effected by means of a common pin 7. The intermediate connecting links 6 carry pivotally attached thereto by means of pins 13, the steering knuckles 5 with laterally extending levers 12 forming a rigid part of said steering knuckles, which latter carry the steered wheels 4. The free ends of said levers 12 are jointed to the piston rods 11, 11', of the steering cylinders 10, 10'. The parallel links 3 are elastically supported by helical springs 1 disposed between the upper and lower parallel link parts adjacent their point of attachment onto the chassis 2.

Communication between the main hydraulic pressure cylinder 15 and the auxiliary steering cylinders 10, 10', and between the latter themselves is established by flexible pipe conduits 16, 17, and 14, the pipe conduit 16 leading from the rear end of the main pressure cylinder 15 to the rear end of the auxiliary steering cylinder 10, and the pipe conduit 17 leading from the head end of the main pressure cylinder 15 to the rear end of the auxiliary steering cylinder 10′, whilst the head ends of the steering cylinders 10, 10′ are connected by the pipe conduit 14.

The operation of the improved hydraulically controlled steering mechanism is as follows:

On displacing the piston 18 of the main hydraulic pressure cylinder 15 by respectively operating the bell crank lever 19, so as to be moved with reference to Fig. 2 from right to left a corresponding quantity of the pressure fluid, for instance oil, contained in the rear portion of said main cylinder 15 is forced through the pipe conduit 16 into the rear portion of the auxiliary cylinder 10, thus causing the piston of said cylinder 10 to also move with reference to Fig. 2 from right to left and thus act upon the wheel 4 by means of the piston rod 11 and the lever 12 which, as already mentioned forms a rigid part of the steering knuckle 5 carrying said wheel 4. Simultaneously with the displacement of the piston 18 a corresponding quantity of pressure fluid is drawn from the cylinder 10′ through the pipe conduit 17 into the head portion of the main cylinder 15, whilst on account of the pressure upon the fluid created by operating the piston 18, a corresponding quantity of the fluid contained in the head portion of the cylinder 10 is forced through the pipe conduit 14 into the head portion of the cylinder 10′, thus also causing the piston of the cylinder 10′ to move with reference to Fig. 2 from right to left, or in other words, the piston of the cylinder 10 is moved forwardly and that of the cylinder 10′ backwardly, both performed piston strokes being of uniform length. By this means a simultaneous and uniform displacement of both piston rods 11, 11′ and consequently also a correspondingly uniform steering and directing of the wheels 4 is assured. The amount and direction of the displacement of the piston 18 determines also the amount and direction of the steering of the wheels.

From the foregoing description with reference to the annexed drawing it will be readily understood that the auxiliary hydraulic steering cylinders take part of the oscillatory movements of their respective wheels in the vertical plane, whilst the respective piston acts upon the steering motion of the wheels in the horizontal plane. And it will also be readily understood that on account of the constant path of motion of the steering knuckle relative to the thus disposed steering cylinder, the rigid steering gear between the steering knuckle or more particularly the steered wheel and the piston of the steering cylinder assures an always non-objectionable working of the entire steering mechanism, that is, all jammings and such like objectionable disturbances, as have been heretofore experienced with known steering mechanism, are absolutely absent.

It is obvious that various changes and modifications may be made to the general arrangement and construction of parts, without departing from the general principle of the invention as set forth in the claims appended hereto, and all rights and privileges for such constructional changes and modifications within the general scope of the invention are reserved herewith.

I claim:

1. In a hydraulically controlled steering mechanism for power driven vehicles with a main pressure cylinder operable from the steering wheel, the combination of auxiliary pressure steering cylinders actuated by the main pressure cylinder, intermediate connecting links, angular brackets for oscillatorily supporting said auxiliary steering cylinders, spring influenced parallel links for supporting said intermediate connecting links and said angular brackets, said angular brackets and intermediate connecting links being pivotally connected to said parallel links, steering knuckles pivoted onto said intermediate connecting links, means for transmitting motion from the auxiliary steering cylinders to the steering knuckles carrying the steered wheels and means for establishing communication between the main pressure cylinder and the auxiliary steering cylinders.

2. In a hydraulically controlled steering mechanism for power driven vehicles with a main pressure cylinder operable from the steering wheel, the combination with each steered wheel of an auxiliary pressure steering cylinder actuated by a common main pressure cylinder, an intermediate connecting link for each steered wheel, an angular bracket for each intermediate connecting link for oscillatorily supporting the steering cylinder, a spring influenced parallel link for supporting the intermediate connecting link, said angular bracket and intermediate connecting link being pivotally attached to said parallel link, a steering knuckle jointed onto said intermediate connecting link and having a laterally extending lever forming a rigid part of said steering knuckle and connected onto the piston rod of the steering cylinder, said piston rod being connected with the steering knuckle in the horizontal plane, and means for establishing communication between the main pressure cylinder and the auxiliary steering cylinders and between the latter themselves.

3. In a hydraulically controlled steering mechanism for power driven vehicles with a main pressure cylinder operable from the steering wheel, the combination with each steered wheel of an auxiliary pressure steering cylinder actuated by a common main pressure cylinder, an intermediate connecting link for each steered wheel, an angular bracket for each intermediate connecting link for oscillatorily supporting the steering cylinder, a spring influenced parallel link for supporting the intermediate connecting link, said angular bracket and intermediate connecting link being pivotally attached to said parallel link, a steering knuckle jointed onto said intermediate connecting link and having a laterally extending lever forming a rigid part of said steering knuckle and connected onto the piston rod of the steering cylinder, said piston rod being connected with the steering knuckle in the horizontal plane and means for establishing communication between the main pressure cylinder and the auxiliary steering cylinders and between the latter themselves, said means consisting of a flexible pipe conduit leading from the rear end of the main pressure cylinder to the rear end of one auxiliary steering cylinder, a pipe conduit leading from the head end of the main pressure cylinder to the rear end of the other auxiliary steering cylinder and a flexible pipe conduit for connecting the head ends of the auxiliary steering cylinders.

JOSEF LATZEN.